(12) United States Patent
Hill

(10) Patent No.: US 11,348,373 B2
(45) Date of Patent: May 31, 2022

(54) EXTENDED REALITY GESTURE RECOGNITION PROXIMATE TRACKED OBJECT

(71) Applicant: Microsoft Technology Licensing, LLC, Redmond, WA (US)

(72) Inventor: Erik Alexander Hill, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/797,333

(22) Filed: Feb. 21, 2020

(65) Prior Publication Data

US 2021/0264140 A1  Aug. 26, 2021

(51) Int. Cl.
| | |
|---|---|
| *G06F 3/01* | (2006.01) |
| *G06V 40/20* | (2022.01) |
| *G06T 7/73* | (2017.01) |
| *G06V 20/20* | (2022.01) |

(52) U.S. Cl.
CPC .............. *G06V 40/20* (2022.01); *G06F 3/011* (2013.01); *G06F 3/017* (2013.01); *G06T 7/74* (2017.01); *G06V 20/20* (2022.01)

(58) Field of Classification Search
CPC .. G06K 9/00335; G06K 9/00671; G06T 7/74; G06F 3/011; G06F 3/017; G06F 3/0304; G06V 40/20; G06V 20/20
See application file for complete search history.

(56) References Cited

U.S. PATENT DOCUMENTS

| | | | |
|---|---|---|---|
| 7,853,041 B2 | 12/2010 | Shamaie | |
| 8,502,785 B2 | 8/2013 | Westerman et al. | |
| 2005/0212767 A1 | 9/2005 | Marvit et al. | |
| 2011/0093820 A1* | 4/2011 | Zhang | A63F 13/77 715/863 |
| 2013/0222232 A1* | 8/2013 | Kong | G06F 3/0304 345/156 |

(Continued)

FOREIGN PATENT DOCUMENTS

| | | |
|---|---|---|
| EP | 3342326 A1 | 7/2018 |
| WO | 2012168886 A2 | 12/2012 |

(Continued)

OTHER PUBLICATIONS

"GestureFX © Product Line", Retrieved from: https://web.archive.org/web/20191112191159/http:/gesturetek.com/index.php, Nov. 12, 2019, 23 Pages.

(Continued)

*Primary Examiner* — Syed Haider
(74) *Attorney, Agent, or Firm* — Schwegman Lundberg & Woessner, P.A.

(57) ABSTRACT

Generally discussed herein are examples of gesture-based extended reality (XR) with object recognition and tracking. A method, implemented by an extended reality (XR) device can include recognizing and tracking one or more objects in the image data, recognizing a gesture in the image data, analyzing the image data to determine whether a condition is satisfied, the condition indicating a recognized and tracked object of the one or more objects proximate which the recognized gesture is to be made, and in response to determining that the condition is satisfied, performing an augmentation of the image data based on satisfaction of the condition.

17 Claims, 6 Drawing Sheets

(56) References Cited

U.S. PATENT DOCUMENTS

| | | | |
|---|---|---|---|
| 2014/0225918 A1* | 8/2014 | Mittal | G06F 3/017 |
| | | | 345/633 |
| 2015/0205360 A1 | 7/2015 | Feng et al. | |
| 2018/0160881 A1* | 6/2018 | Okabe | G06F 3/04845 |
| 2021/0065450 A1* | 3/2021 | Shin | G02B 5/0284 |

FOREIGN PATENT DOCUMENTS

| | | | |
|---|---|---|---|
| WO | 2014085764 A1 | 6/2014 | |
| WO | 2018118538 A1 | 6/2018 | |

OTHER PUBLICATIONS

"WallFX® Interactive Wall Projection System", Retrieved from: http://gesturetek.com/oldhome/gesturefx/productsolutions_wallfx.php, Retrieved Date: Dec. 9, 2019, 4 Pages.

Montero, et al., "Context-Based Gesture Recognition", In Journal of Iberoamerican Congress on Pattern Recognition, Nov. 14, 2006, 10 Pages.

"International Search Report and the Written Opinion Issued in PCT Application No. PCT/US2021/014063", dated May 17, 2021, 15 Pages.

* cited by examiner

EXTENDED REALITY GESTURE RECOGNITION PROXIMATE TRACKED OBJECT

TECHNICAL FIELD

Examples generally relate to gesture recognition and object tracking and more specifically to gesture recognition and object tracking using a wearable extended reality (XR) device.

TECHNICAL BACKGROUND

Augmented reality (AR) includes a presentation of a real-world image or image stream that is augmented (e.g., modified, altered, or amended) with a sensory output such as a sound or visual augmentation. Augmenting image data is generally done in real-time. In general, AR supplants a real-world view that is captured, processed, and output to provide a simulated view. Virtual reality (VR), in contrast, provides a complete immersion experience that is completely segregated from the physical world. Mixed reality (MR) combines elements of AR and VR to allow virtual and real-world objects to interact. Extended reality (XR) covers the various technologies that enhance human senses. XR can include VR, MR, AR, or a combination thereof.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed herein.

DESCRIPTION OF EMBODIMENTS

Discussed generally herein are systems, devices, and methods for XR and associated XR user interactions. Systems, devices, and methods may be implemented using a wearable display, such as a head-wearable display, or in connection with another XR-capable computing device (e.g., mobile computing devices, such as smartphones).

Various XR user interactions may be provided through the use of an XR device having a camera and a display. One way of interacting with a body-mounted camera is for a wearable device to use machine-vision to detect a person's finger or hand gesture or other gesture object's gesture that may be interpreted as a command. The person can be the user wearing the device or another person that is in the field of view of the camera. A gesture (e.g., air gesture) in front of a wearable camera combined with object recognition and tracking may provide a variety of usage models and applicability to XR applications.

The wearable device generally includes an image (e.g., video) capturing mechanism, such as a camera (e.g., a depth camera, color camera, or a combination thereof), and an output device to display a captured image to a user. The image capture device may be mounted to capture a gesture in a field of view of the image capture device. The gesture may be recognized by the device. The gesture may be performed by a user wearing the wearable device or a different person, such as a person in a field of view of the of the image capturing mechanism.

The wearable device can recognize and track an object. The wearable device can determine whether a recognized gesture occurred proximate a recognized and tracked object. Proximate the tracked object can be from the perspective of the user wearing the device. Proximate the tracked object can include at least partial or full occlusion of the tracked object (from the perspective of the wearable device), or within a specified distance of the tracked object. The gesture may cause the XR device to augment image data captured by the camera based on a variety of data, such as the gesture, tracked object, a context, a spoken sound, a gesture-selected operation, an augmentation operation defined in advance (e.g., by the user wearing the wearable device, the user or an agent of the user performing the gesture, or the like), a circumstance, or a combination thereof, among others.

Reference will now be made to the FIGS. to further describe details of systems, apparatuses, and methods for XR.

Figure 1:
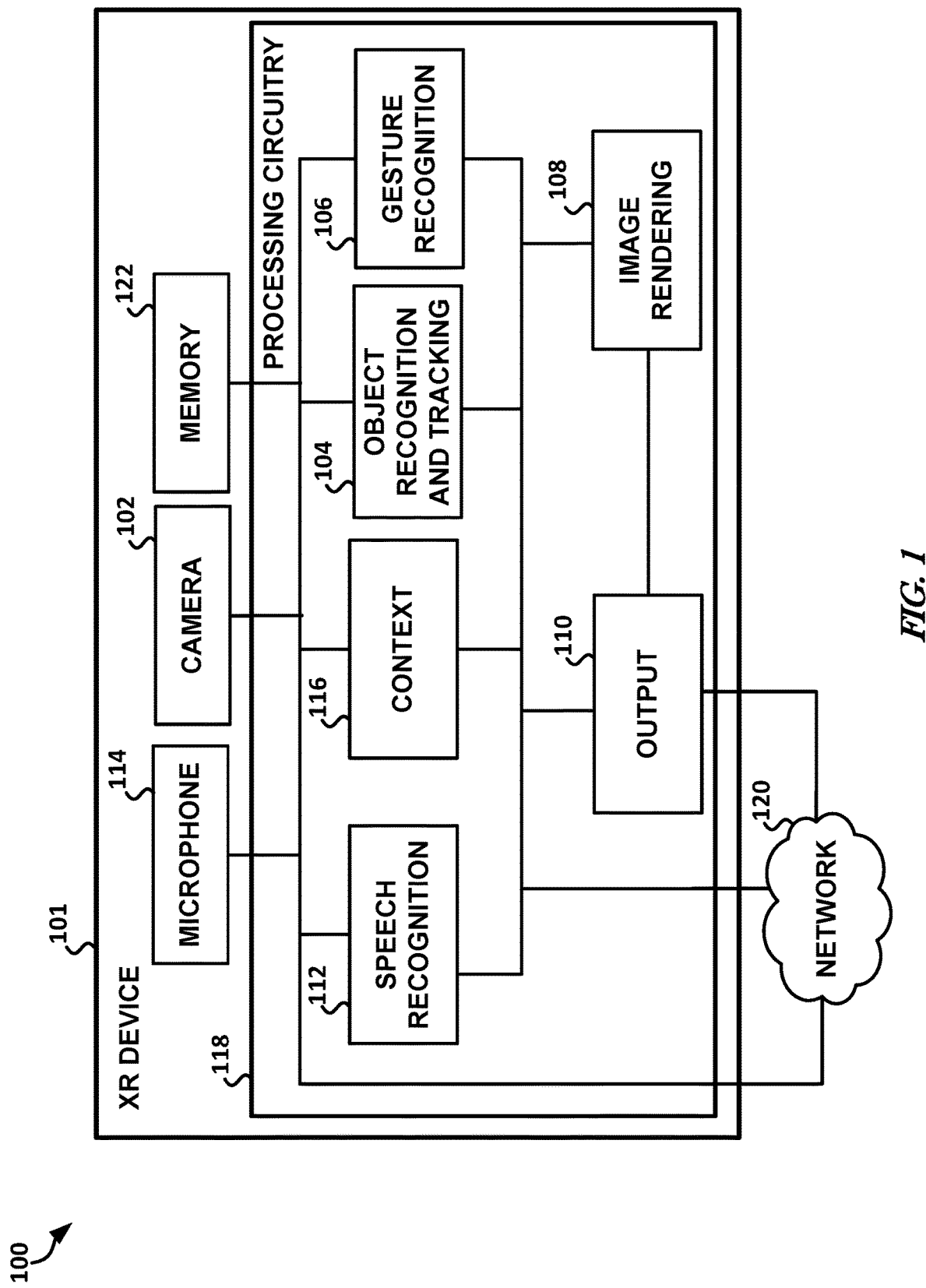
FIG. 1 illustrates a conceptual block diagram of an example of an XR system.

FIG. 1 shows an example of an embodiment of an XR system 100. The XR system 100 as illustrated includes an XR device 101 that may include a camera 102, a microphone 114, and processing circuitry 118. The processing circuitry 118 can perform operations, such as an object recognition and tracking operation 104, a gesture recognition operation 106, an image rendering operation 108, a context identification operation 116, a speech recognition operation 112, and an output operation 110. One or more of the microphone 114, the camera 102, and the memory 122 can be communicatively coupled to the processing circuitry 118. The network 120 can be communicatively coupled to one or more of the microphone 114, the camera 102, and the memory 122 and the processing circuitry 118. The operations can be performed by the processing circuitry 118 executing code, operating special purpose hardware, or a combination thereof.

The camera 102 may translate a scene in a field of view of the camera 102 into image data (e.g., video, still, or other image data). The camera 102 may include a digital camera, video camera, camera phone, or other image capturing device. The camera 102 may include a depth camera, an intensity camera, or the like. A depth camera provides measurements of distances to objects in the field of view of the depth camera. The depth measurement is typically performed using time of flight (ToF). An intensity camera captures intensity data, such as red, blue, green, yellow, grayscale, black, white, infrared, thermal, a combination thereof, or the like.

The object recognition and tracking operation 104 may detect or recognize (e.g., detect and identify) an object in the image data. The object recognition and tracking operation 104 may delineate (e.g., extract) an object from the image data, such as to isolate the object from the surrounding environment in the field of view of the camera 102 or in the image data. The object recognition and tracking operation 104 may use at least one of an appearance-based method or feature-based method, among other methods, to detect, recognize, or delineate an object.

The appearance-based method may include generally comparing a representation of an object to the image data to determine if the object is present in the image. Examples of appearance-based object detection methods include an edge matching, gradient matching, color (e.g., greyscale) matching, "divide-and-conquer", a histogram of image point relations, a model base method, or a combination thereof, among others. The edge matching method may include an edge detection method that includes a comparison to templates of edges of known objects. The color matching method may include comparing pixel data of an object from image data to previously determined pixel data of reference objects. The gradient matching method may include comparing an image data gradient to a reference image data gradient. The "divide-and-conquer" method may include comparing known object data to the image data. The histogram of image point relations may include comparing relations of image points in a reference image of an object to the image data captured. The model base method may include comparing a geometric model (e.g., eigenvalues, eigenvectors, or "eigenfaces", among other geometric descriptors) of an object, such as may be stored in a model database, to the image data. These methods may be combined, such as to provide a more robust object detection method.

The feature-based method may include generally comparing a representation of a feature of an object to the image data to determine if the feature is present and inferring that the object is present in the image data if the feature is present. Examples of features of objects include a surface feature, corner, or edge shape. The feature-based method may include a Speeded Up Robust Feature (SURF), a Scale-Invariant Feature Transform (SIFT), a geometric hashing, an invariance, a pose clustering or consistency, a hypothesis and test, an interpretation tree, or a combination thereof, among other methods.

Delineating an object may include determining bounds of an extent (e.g., outline (sometimes called a silhouette), ellipse, bounding box, or the like of an object and determining image data (e.g., pixel values) within the extent. The determined image data or pixel values may be displayed altered or unaltered. The determined image data or pixel values may be provided to the context operation 116. A user in the field of view of the camera 102 may cause one or more operations to be performed on a delineated object. The operation can be performed in response to a gesture or command proximate the delineated object. The operation can be performed while the delineated object and the user (at least a portion of the user) are within the field of view.

Object tracking is the process of locating a moving object over time. The goal of object tracking is to associate an object in consecutive (or every N, where N>1) video frames. Some tracking techniques include kernel-based tracking and contour tracking. In kernel-based tracking an iterative localization procedure maximizes a similarity measure that indicates similarity between frames. In contour tracking, a contour of a previous frame is iteratively evolved to a new position in a current frame. The contour tracking approach can minimize a contour energy, such as by using gradient descent.

The gesture recognition operation 106 may identify a body part (e.g., hand, finger, arm, leg, head, hip, foot, or the like) in image data (e.g., image data corresponding to a single frame or image data corresponding to a series of frames or multiple frames) and determine its motion, configuration, or a combination thereof. The motion or configuration can be used to determine if a recognizable gesture has been performed. The determination of the body part motion can be performed in object tracking, such as by the object recognition and tracking operation 104. The gesture recognition operation 106 may process gestures that are on-line or offline. An on-line gesture is generally a direct manipulation gesture that is used to modify an object, whereas an offline gesture is a gesture that is processed after an interaction with an object (e.g., activating a menu screen).

The gesture recognition operation 106 may use a three-dimensional (3D) or two-dimensional (2D) recognition method. Generally, a two-dimensional recognition method requires fewer computer resources to perform gesture recognition than a three-dimensional method. The gesture recognition operation 106 may implement a skeletal-based method or an appearance-based method, among others. The skeletal-based method includes modeling a body part as one or more segments and one or more angles between the segments. The appearance-based model includes using a template of a body part and comparing the template to the image data to determine if a body part substantially matching the template appears in the image data.

The image rendering operation 108 may modify the image data, such as to augment the image data and provide an AR image. The image rendering operation 108 may alter the image data based on data from the memory 122, the object recognition and tracking operation 104, the gesture recognition operation 106, a speech recognition operation 112, a context operation 116, or a combination thereof. FIGS. 2-5 show examples of a variety of image augmentations, or other operations, or other operations, or other operations, such as may be performed by the image rendering operation 108.

The output operation 110 may control a speaker, a radio (e.g., Bluetooth, cellular, or other radio) receiver, transmitter, or transceiver, a display, projector, or other device. The output operation 110 may be operable to provide a view of an image captured by the camera 102 or a view of an augmented image corresponding to augmented image data, such as may be provided by the image rendering operation 108. The output operation 110 may control a Liquid Crystal Display (LCD), a Light Emitting Diode (LED), a plasma display, a touch screen display, or a projector or screen, among others.

The speech recognition operation 112 may interpret a sound (e.g., a word or phrase) captured by the microphone 114. The speech recognition operation 112 may provide data indicative of the interpretation. The sound may be interpreted using a Hidden Markov Model (HMM) method or a neural network method, among others.

The context operation 116 may determine a user's circumstance and cause the image rendering operation 108 to alter the image data from the camera 102 based on the determined circumstance. Examples of circumstances may include a user exercising, conversing, driving, shopping, eating, watching a program (e.g., a movie, television, or other program), working, visiting a person, place, or thing, standing on a stage, among others. The circumstance of the user may be determined based on at least one of a location, speed, or direction of the user, one or more people or other tracked objects in the image data, a date or time of day, or an application state of an application running on the user's wearable device.

In one or more embodiments, if the circumstance of the user is a coffee shop or other social situation, voice commands (e.g., the speech recognition operation 112 or microphone 114) may be disabled. In one or more embodiments, if the user is traveling within a first range of speeds, the user may be determined to be walking or running. If another person's voice is consistently being picked up by the microphone 114, the user may be determined to be conversing with another person or listening to another person's voice, such as at a play, performance, on television, or the like. In one or more embodiments, a combination of a location and a person or object in the field of view of the camera 102 may indicate that a user is visiting a friend or family member.

The XR device 101 may include a wired or wireless connection to a network 120 (e.g., the internet or a cellular or WiFi network, among others). The network 120 may provide an interface through which a user can provide data. The network 120 may provide an interface through which a user can provide data. The network 120 may provide an interface through which a user can provide data. The network 120 may provide data that may be provided to a user of the XR device 101, such as through the output operation 110. For example, the network 120 may provide directions, data about an object in the image data, an answer to a question posed through the speech recognition operation 112, an image (e.g., video or series of images) requested, an augmentation to the image data, or other data.

The user may access a webpage, application, or the like through the network 120 or the XR device 101. The user can associate an augmentation operation, a condition, a circumstance, an object (e.g., entity on or near which to perform the augmentation), a combination thereof, or the like, with a gesture through the webpage or application. The augmentation operation can be performed in response to detection of the associated gesture and satisfaction of the condition, circumstance, or the like. Performance of the augmentation operation and satisfaction of the condition, circumstance, or other associated data can be managed by the context operation 116.

The user can define one or more conditions to be satisfied before the operation is performed. To perform the operation, the one or more conditions may be required to be met and the gesture may be required to be detected. Using the webpage or application, the user can define a timeframe for detection of the gesture and conditions. For example, the user can require that the gesture happen with X seconds (where X>0) of a condition for the operation to be performed. The conditions can be defined by the user through the network 120 or the XR device 101. An example data entry that can be accessed in the memory 122, by the context operation 116, can include (gesture, object, circumstance, condition, timing, augmentation).

The gesture indicates the motion of the gesture object to be recognized. The object indicates the gesture object that performs the gesture. The circumstance indicates the social circumstance of the gesture object that performs the gesture and can be determined by the context operation 116. The condition can indicate a relative position of the gesture object and a tracked object. The timing may indicate a permissible amount of time between gesture detection and circumstance or condition satisfaction. The timing may indicate an amount of time between the detection of the gesture, circumstance, condition, or a combination thereof and performance of the augmentation. The augmentation indicates how to respond, such as by altering the image data or issuing a command, or issuing a command, or issuing a command, in response to satisfaction of other portions of the data entry. The circumstance, condition, or timing being blank can indicate that a default value or no restriction is to be used.

The gesture is a motion or orientation identifiable by the gesture recognition operation 106. Examples of gestures include finger point, leg kick, arm roll, flat palm, swipe left, right, up, down, or an angle therebetween, arms crossed, hands intertwined, nail bite, hand on cheek or other body part or object, tap or drum fingers, head tilt, lay down, roll, rub hands together, place tips of fingers together, interact with specified object, head in hands, legs together or apart, bent or straight knees or other joint, or the like.

The tracked and recognized object is an identifiable item. The identification can be by the object recognition and tracking operation 104. Examples of tracked and recognized objects include a person or other mobile object, such as a vehicle (e.g., a manned or unmanned aerial vehicle, a car, truck, or other land vehicle, a remote controlled vehicle, a water vehicle, such as a boat, ship, submarine, or the like), an animal (e.g., a dog, monkey, dolphin, bird, cat, mouse, etc.), a stationary object on a mobile track, a stationary object, or the like. Stationary objects are sometimes not trivial to track due to the movement of the user wearing the XR device 101.

For example, a user may define, using the network 120 or the XR device 101, a gesture as an arm roll. The arm roll can include a user starting with their hand near their shoulder and unfolding the arm to be about straight. The gesture object can be defined as a person in the field of view or more specifically as a person with a characteristic, such as a color, feature, or the like. The condition can be defined such that the user needs to be detected on or within a certain distance (e.g., within one an inch or less, multiple inches, a foot or less, multiple feet, a meter, a half meter or less, multiple meters, a greater or lesser distance, or a distance therebetween) of a recognized and tracked object, such as a stage, a field, a famous landmark (e.g., a mountain, the Eiffel Tower, the largest ball of yarn, or the like), or the like. Proximate can thus be based on the condition for augmentation. For example, proximate can be a few inches for a person at a podium, proximate can be on (zero space between the person and the tracked object) for a person on a field, or multiple meters for a person with the Eiffel Tower of a mountain behind them. The XR device 101 can be caused to recognize and track the object, the gesture object, and determine if the condition is satisfied. What is meant by proximate can be defined as part of the condition. The augmentation can include displaying birds flying out of the hand of the user. This scenario is illustrated in and further described regarding FIGS. 4-5.

Under these circumstances, assume a first person and a second person are within the field of view of the camera 102. The first person is on a recognized and tracked stage and the second is not sufficiently near the stage (e.g., not within a threshold distance or number of pixels of the stage (relative to the person wearing the device 101). If the second person performs the arm roll, the gesture recognition operation 106 can detect the gesture and provide data indicative of the gesture and location of the gesture to the context operation 116. The object recognition and tracking operation 104 can provide data indicative of recognized and tracked objects and their locations to the context operation 116. Based on this data, the context operation 116 can determine that the second person is not near the stage so the operation associated with the condition will not be performed. If a different context is defined that does not require the condition of being near the recognized and tracked stage, the context operation 116 can identify the operation to be performed and provide data indicative of the operation to the image rendering operation 108. Thus, two people performing the same gesture (in the same field of view), can affect the output operation 110 differently.

Figure 2:
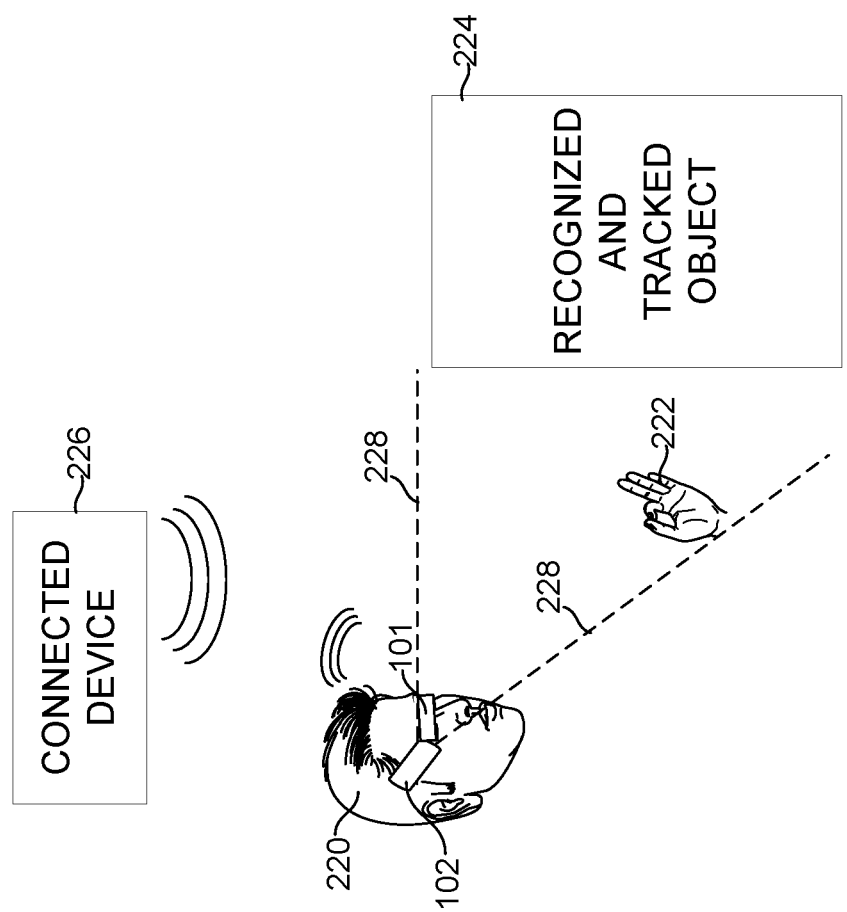
FIG. 2 illustrates a conceptual block diagram of an example of using an XR device, such as the XR device of FIG. 1.

FIG. 2 illustrates a conceptual block diagram of an embodiment of using the XR device 101. In FIG. 2, a user 220 is wearing the XR device 101. The camera 102 includes a field of view 228 illustrated by a pair of diverging broken lines. In the field of view 228, a gesture is performed by hand 222. The gesture is performed proximate a recognized and tracked object 224. Operation of the recognized and tracked object 224, in the example of FIG. 2, is controlled by a connected device 226.

The connected device 226 can be communicatively coupled to the XR device 101 and the recognized and tracked object 224. The XR device 101 can be communicatively coupled to the recognized and tracked object 224. The communicative coupling can include a wired or wireless coupling. The wireless coupling can include a cellular, Bluetooth, WiFi, or other wireless coupling. The XR device 101 or the connected device 226 can provide a command to the recognized and tracked object 224. The command can cause the recognized and tracked object 224 to perform an operation. The command can be determined based on the detected gesture, the object proximate the gesture object (if there is one), or the like. The command can be defined by the user 220, as discussed regarding FIG. 1.

Consider FIG. 2 and assume the connected device 226 is a projector and the recognized and tracked object 224 is a projector screen. If the user 220 wearing the XR device 101 is watching a projected image on the screen, and the screen is a tracked object, a gesture (which normally means something like "open map") can be contextually identified to mean "move to the next slide." In performing this operation, the gesture recognition operation 106 can identify the gesture in the image data, the object recognition and tracking operation 104 can identify and track the screen, the context operation 116 can determine that the gesture is proximate the screen, and the context operation 116 can determine based on data in the memory 122, the operation to be performed ("move to the next slide" in this example). The output operation 110 can provide a command to the connected device 226, that causes the connected device 226 to perform the operation.

If the processing circuitry 118 includes a radio or other communication device, the user 220 or other person that includes a body part in the field of view 228, may perform a gesture (or voice command) that causes the radio to transmit a signal that provides a signal (e.g., a command) to the connected device 226. The user 220 or other person may perform a gesture (or voice command) that causes the radio to transmit a signal that commands the recognized and tracked object 224 that appears in the field of view 228 of the camera 102. The recognized and tracked object 224 may be proximate a gesture recognized in the image data.

Figure 3:
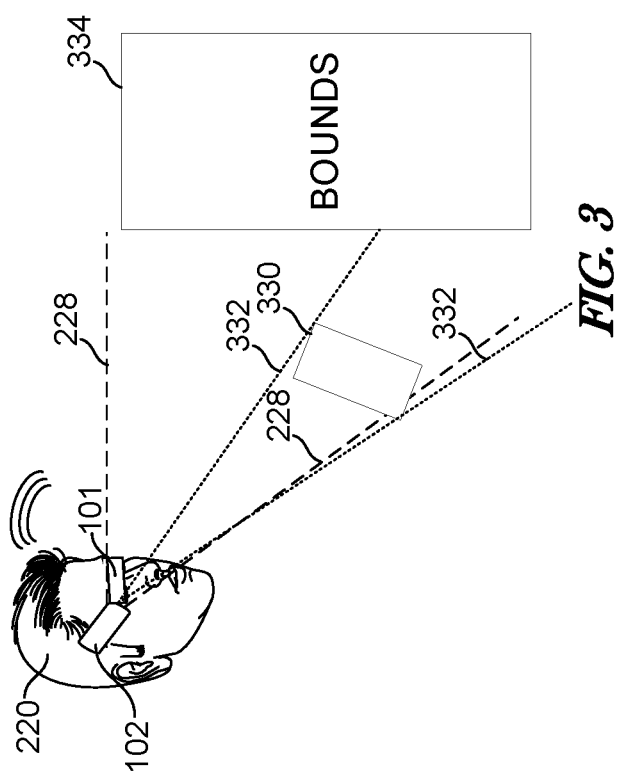
FIG. 3 illustrates a conceptual block diagram of an example of determining whether the gesture is performed proximate a recognized and tracked object.

FIG. 3 illustrates a conceptual block diagram of an embodiment of determining whether the gesture is performed proximate a recognized and tracked object. In recognizing and tracking an object, the object recognition and tracking operation 104 can determine bounds of an object. The bounds can include a bounding box, a bounding ellipse, a bounding silhouette, or the like. In general, the bounds define the pixels of the image data that are considered to be part of the object.

In FIG. 3, bounds 330 indicate the bounds of the hand 222 from FIG. 2 and bounds 334 indicate the bounds of the recognized and tracked object 224, also from FIG. 2. In determining whether the gesture is proximate the recognized and tracked object 224, the bounds 330 of the gesture object that performed the detected gesture can be projected to a depth of the recognized and tracked object 224 (as indicated by lines 332). If the bounds 330, after projection, are within a specified distance of the bounds 334 (e.g., a specified number of pixels), the gesture can be determined to have occurred proximate the recognized and tracked object 224.

Another way of determining whether the gesture occurs proximate recognized and tracked object, includes determining whether the bounds 330 of the gesture object that performed the gesture at least partially occludes the bounds 334 of the recognized and tracked object. The bounds 334 can be estimated, such as from a prior frame or other estimation. If the object, in a subsequent frame does not span same or similar bounds (e.g., after rotation, translation, scaling, or the like to account for object motion of an object model), it is at least partially occluded. Then it can be determined whether the gesture object that performed the gesture at least partially occludes the bounds 334 of the recognized and tracked object 224.

Figure 4:
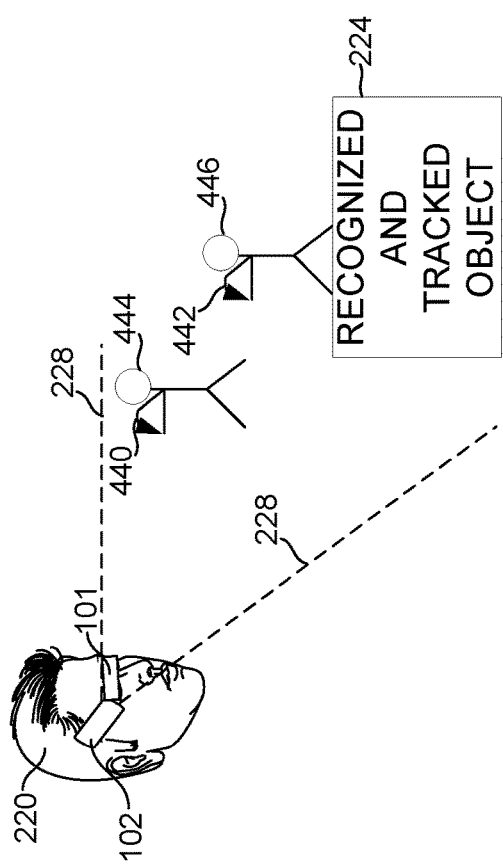
FIG. 4 illustrates a conceptual block diagram of another example of using an XR device, such as the XR device of FIG. 1.

FIG. 4 illustrates a conceptual block diagram of another embodiment of using the XR device 101. In FIG. 4, multiple people 444, 446 performing respective gestures are in the field of view 228 of the camera 102. The gesture of the person 444 is indicated by arrow 440. The gesture of the person 446 is indicated by person 446. The person 446 is illustrated as being on the recognized and tracked object 224. The person 444 is not proximate the recognized and tracked object 224.

Referring to FIG. 1 and considering the scenario presented in FIG. 4, the gesture recognition operation 106 can determine that the person 444 is performing a gesture and the person 446 is performing the same or a different gesture. The object recognition and tracking operation 104 can recognize and track one or more of the person 444, 446 and the recognized and tracked object 224. The context operation 116 can look up the recognized gesture and determine whether a condition is associated with an operation associated with the recognized gesture. In the example of FIG. 4, assume the gestures are the same and that there is a condition for performing an augmentation operation in response to the gesture. Assume further that the condition is the gesture needs to be performed proximate the recognized and tracked object 224.

Figure 5:
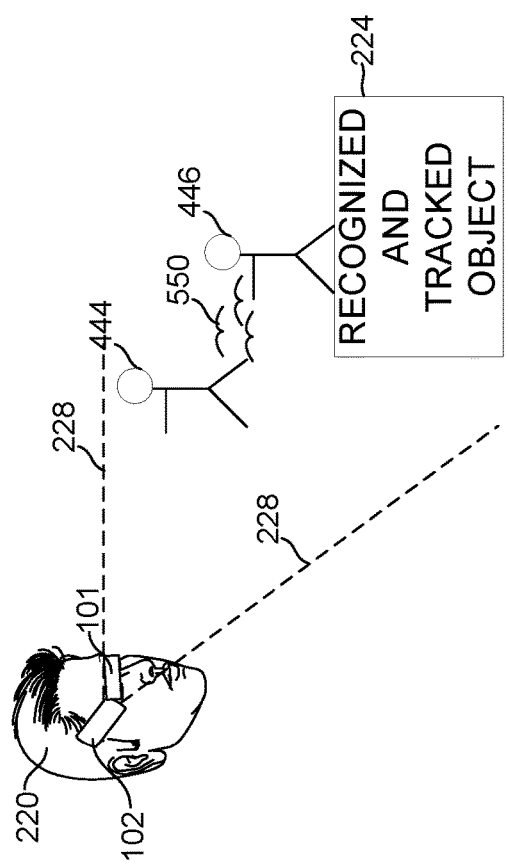
FIG. 5 illustrates a conceptual block diagram of an example of an augmentation based on assumptions presented regarding FIG. 4.

FIG. 5 illustrates a conceptual block diagram of an embodiment of an augmentation based on the assumptions presented regarding FIG. 4. The context operation 116 can indicate to the image rendering operation 108, the augmentation to be performed. In the example of FIG. 5, an augmentation 550 is provided in response to the person 446 performing the gesture. In the example of FIG. 5, no augmentation is provided in response to the person 444 performing the gesture. This is because the condition of being proximate the recognized and tracked object 224 is satisfied by the person 446 and not by the person 444.

Figure 6:
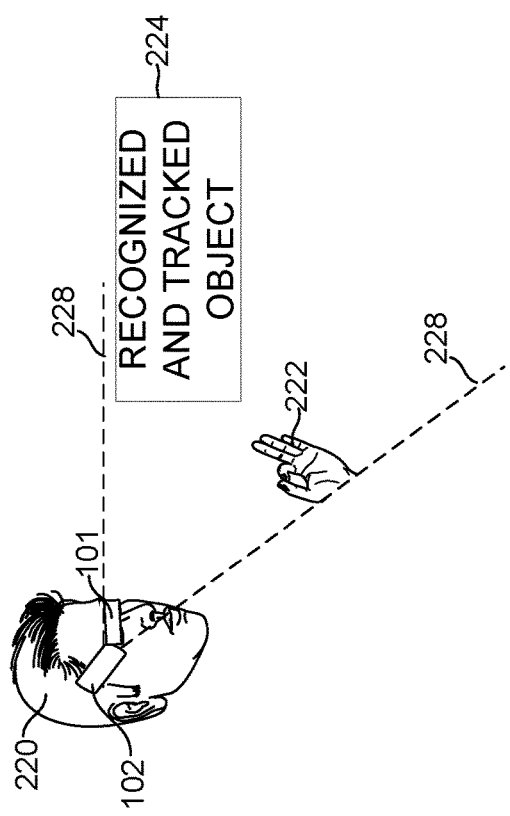
FIG. 6 illustrates a conceptual block diagram of another example of using an XR device, such as the XR device of FIG. 1.

FIG. 6 illustrates a conceptual block diagram of another example of using the XR device 101. In FIG. 6, a gesture is performed by the hand 222. However, from the perspective of the camera 102, the hand 222 is not proximate the recognized and tracked object 224. If the camera 102, the hand 222, or the recognized and tracked object 224 were in a different location, the determination of whether the hand 222 is proximate the recognized and tracked object 224 can be different.

Figure 7:
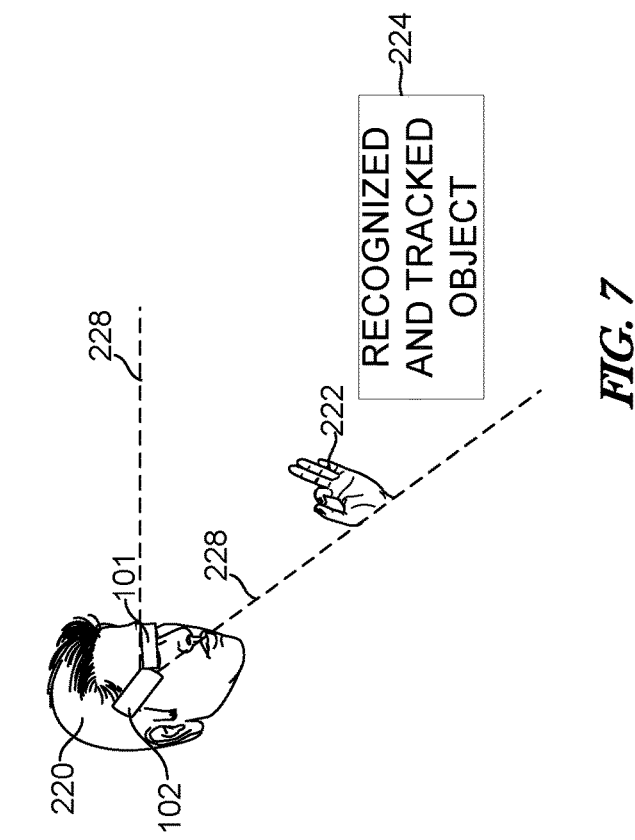
FIG. 7 illustrates a conceptual block diagram of another example of using an XR device, such as the XR device of FIG. 1.

FIG. 7 illustrates a conceptual block diagram of another example of using the XR device 101. In FIG. 7 a gesture is performed by the hand 222. From the perspective of the camera 102, the hand 222 is proximate the recognized and tracked object 224 (e.g., at least partially occludes the recognized and tracked object 224).

Consider FIGS. 6 and 7 and assume the recognized and tracked object 224 is a tablet. If the user performs a gesture as in the orientation of FIG. 6, the XR device 101 can interpret that as a command to perform a first operation (e.g., display the weather). Interpreting this gesture, in the circumstances of FIG. 6 is difficult for the XR device 101. This is due, at least n part, to the changing nature of the surrounding environment. However, if the user 220 looks at their tablet (the recognized and tracked object 224), and they perform the same gesture, this is not only easier for the XR device 101 to recognize (since the gesture was performed in front of the recognized and tracked object 224 it can act as a virtual green screen), but the gesture can have a different meaning ("bookmark this page").

In one or more embodiments, a user may perform a gesture proximate to an object (or speak a voice command) that causes the camera 102 to begin recording or provide a live video feed focused on an object in the field of view of the camera 102. The camera 102 may auto-focus on the object so as to provide a clear(er) view of the object or a recorded video that may be accessed by the user. The user may stop the camera 102 recording or live video feed with another gesture (e.g., the same gesture) or voice command.

In one or more embodiments, the object recognition operation 104 may recognize multiple objects in a given scene and the user may perform a gesture recognized by the gesture recognition operation 106 that causes the image rendering operation 108 to perform an operation on one or more of the multiple recognized objects. In one or more embodiments, a device gesture (e.g., a head motion or other bodily motion that moves a wearable device, a touchscreen input, or other input), may be used in lieu of or in combination with one or more gestures to provide a command to the image rendering operation 108 that causes the image rendering operation 108 to perform an operation on the image data.

In another example, if a first gesture (or voice command) is recognized, and the gesture is performed proximate (or the voice command targets) a first recognized and tracked object and the context operation 116 determines the user is in a first circumstance, a first command (or no command) may be provided. If the same gesture (or voice command) is recognized, the gesture is performed proximate (or targets) the same recognized object, and the context operation 116 determines the user is in a second circumstance different from the first social circumstance, a second command (or no command), different from the first command may be provided. Thus, the command executed may be dependent on the social circumstance as determined by the context operation 116.

Note that the functionality discussed with regard to a specific operation may be implemented by another operation or item. For example, the functionality provided by the context operation 116 may be performed by the image rendering operation 108 or the network 120. Other functionality discussed with regard to the operations of the FIGS. may be performed by other components or operations of FIGS.

In one or more embodiments, an operation that may be performed using gesture recognition may be performed or altered through a sound spoken by the user. For example, a user may perform a gesture and at or around the time the gesture is performed, the user may enunciate a sound. The enunciated sound may be associated with a recognized and tracked object proximate the performed gesture, such as to cause the image rendering operation 108 to associate the announced sound with the recognized and tracked object and cause the sound (in text form) to be displayed proximate the recognized and tracked object. In another example, an operation caused by a gesture being performed that causes the image rendering operation 108 to add text near an object may also be caused to be performed by the user saying the name of the object. In one or more embodiments, a sound spoken at or around a time a user performs a gesture may indicate to the XR device 101 to which object the gesture is directed.

Figure 8:
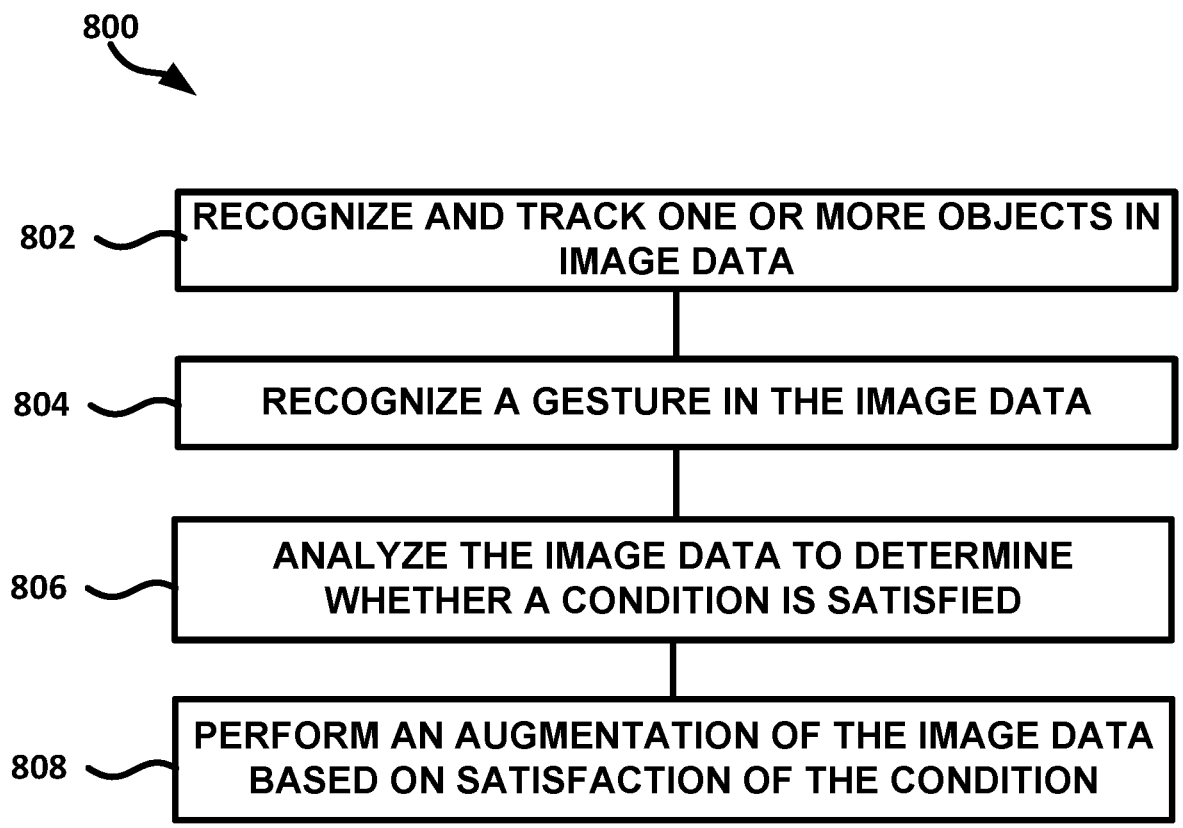
FIG. 8 illustrates a flow diagram of an example of a method for XR based on gesture recognition proximate a tracked object.

FIG. 8 shows a flow diagram of an example of a method 800 for providing an augmented reality image. The method may be implemented using one or more components, devices, or operations of FIG. 1. The method 800 as illustrated includes: recognizing and tracking one or more objects in the image data, at operation 802; recognizing a gesture in the image data, at operation 804; analyzing the image data to determine whether a condition is satisfied, at operation 806; performing an augmentation of the image data based on satisfaction of the condition, at operation 808. The condition can indicate a recognized and tracked object of the one or more objects proximate which the recognized gesture is to be made. The operation 808 can be performed in response to determining that the condition is satisfied.

The method 800 can further include, wherein the operations further comprise, in response to determining the condition is not satisfied, refraining from performing the augmentation on the image data. The method 800 can further include, wherein the operations further comprise receiving, by a user, data indicating the gesture, condition, and the augmentation. The method 800 can further include, wherein analysis of the image data to determine whether the condition is satisfied includes determining whether the gesture at least partially occludes the recognized and tracked object.

The method 800 can further include, wherein an XR device that performs the method 800 is worn by a user and the gesture is performed by a person in a field of view of the camera that is different from the user.

The method 800 can further include determining whether a circumstance, in addition to the condition, is satisfied. The circumstance indicating a social circumstance of a person performing the gesture or an action to be performed by the person performing the gesture.

The method 800 can further include analyzing the image data to determine whether the circumstance is satisfied. The method 800 can further include, in response to determining the condition and circumstance are satisfied, perform the augmentation on the image data. The method 800 can further include, in response to determining one of the condition or the circumstance are not satisfied, refrain from performing the augmentation on the image data.

The method 800 can further include, wherein analysis of the image data to determine whether the condition is satisfied includes determining the gesture occurred, from the perspective of the user, within a specified distance of the recognized and tracked object. The method 800 can further include, wherein analysis of the image data to determine whether the condition is satisfied includes determining a person performing the gesture is, from the perspective of the user, within a specified distance of the recognized and tracked object. The method 800 can further include, wherein the object is a real object, as opposed to a virtual object.

Using depth cameras, it is easier to filter background better than using another type of camera, such as an intensity camera. If tracking an object, it is known what the object looks like, what the object is displaying in the case of a display object, or if a gesture is performed at a similar depth to what was being displayed. If the display device is a tracked object, it is helpful to know what is being displayed. If it is known what the display object is displayed, the object being displayed can be compared to the known image from tablet to yield the gesture. To achieve this, the device 224 can communicate what is being displayed to the XR device 101.

If the concept of a known rear occluding object acting as a virtual green screen is extended, any tracked object can be used a green screen. Such systems and devices allow for operations, such as recording video only of the objects in front of the tracked object, or allowing for improved occlusion, such as for holograms.

An object as used herein is a real object, as opposed to a virtual object. Examples of objects in include the recognized and tracked object, the gesture object, and other objects in the image data.

Figure 9:
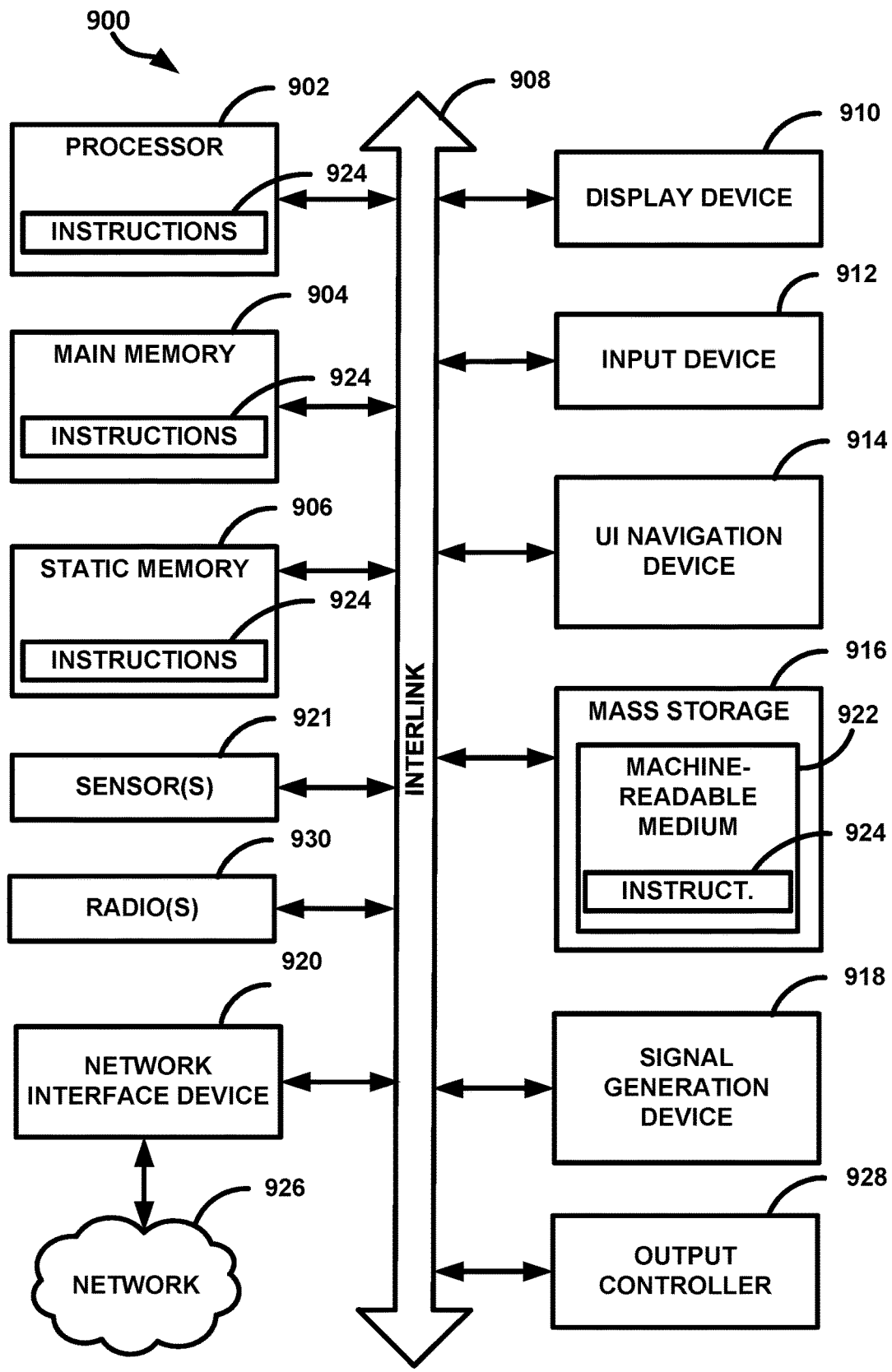
FIG. 9 illustrates a conceptual block diagram of an example of a computing device.

FIG. 9 shows a block diagram of an example of a computing device 900, in accord with one or more embodiments. The device 900 (e.g., a machine) may operate so as to perform one or more of the programming or communication techniques (e.g., methodologies) discussed herein. In some examples, the device 900 may operate as a standalone device or may be connected (e.g., networked) to perform one or more operations, such as those of the camera 102, the object recognition and tracking operation 104, the gesture recognition operation 106, image rendering operation 108, output operation 110, speech recognition operation 112, context operation 116, or other component or operation of the FIGS. In other examples, the one or more items of the device 900 may be a part of the camera 102, microphone 114, the processing circuitry 118, the memory 122, the network 120, or other component of the FIGS. \, or the like, as discussed herein.

Embodiments, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively may be coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Device (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The device 900 may further include a display unit 910, an input device 912 (e.g., an alphanumeric keyboard), and a user interface (UI) navigation device 914 (e.g., a mouse). In an example, the display unit 910, input device 912 and UI navigation device 914 may be a touch screen display. The device 900 may additionally include a storage device (e.g., drive unit) 916, a signal generation device 918 (e.g., a speaker), a network interface device 920, and one or more sensors 921, such as a global positioning system (GPS) sensor, compass, accelerometer, or another sensor. The device 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 900 may include one or more radios 930 (e.g., transmission, reception, or transceiver devices). The radios 930 may include one or more antennas to receive signal transmissions. The radios 930 may be coupled to or include the processor 902. The processor 902 may cause the radios 930 to perform one or more transmit or receive operations. Coupling the radios 930 to such a processor may be considered configuring the radio 930 to perform such operations. In general, an item being "caused" to perform an operation includes the item receiving data, interpreting the data as a command to perform an operation, and performing the operation. The signal does not have to be issued by the item that is causing the other item to perform the operation. Generally, "a first item causing a second item to perform an operation" means that the first item provided data that is already properly formatted to communicate with the second item or needs formatting and eventually becomes data that the second item receives and interprets as a command to perform the operation.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the device 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924. The term "machine readable medium" may include any tangible medium that is capable of storing, encoding, or carrying instructions for execution by the device 900 and that cause the device 900 to perform any one or more of the techniques of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media may include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 900, and includes digital or analog communications signals or other intangible medium to facilitate communication of such software.

EXAMPLES AND NOTES

The present subject matter may be described by way of several examples.

Example 1 may include a device comprising a camera, processing circuitry configured to receive image data from the camera, and a memory device coupled to the processing circuitry and having a program stored thereon for execution by the processing circuitry to perform operations comprising recognizing and tracking one or more objects in the image data, recognizing a gesture in the image data, analyzing the image data to determine whether a condition is satisfied, the condition indicating a recognized and tracked object of the one or more objects proximate which the recognized gesture is to be made, and in response to determining that the condition is satisfied, performing an augmentation of the image data based on satisfaction of the condition.

In Example 2, Example 1 may further include, wherein the operations further comprise, in response to determining the condition is not satisfied, refraining from performing the augmentation on the image data.

In Example 3, at least one of Examples 1-2 may further include, wherein the operations further include receiving, by a user, data indicating the gesture, condition, and the augmentation.

In Example 4, at least one of Examples 1-3 may further include, wherein analysis of the image data to determine whether the condition is satisfied includes determining whether the gesture at least partially occludes the recognized and tracked object.

In Example 5, at least one of Examples 1-4 may further include, wherein the XR device is worn by a user and the gesture is performed by a person in a field of view of the camera that is different from the user.

In Example 6, at least one of Examples 1-5 may further include, wherein the memory further includes a circumstance, in addition to the condition, that must be detected to perform the augmentation, the circumstance indicating a social circumstance of a person performing the gesture or an action to be performed by the person performing the gesture.

In Example 7, Example 6 may further include, wherein the operations further comprise analyzing the image data to determine whether the circumstance is satisfied, in response to determining the condition and circumstance are satisfied, perform the augmentation on the image data, and in response to determining one of the condition or the circumstance are not satisfied, refrain from performing the augmentation on the image data.

In Example 8, at least one of Examples 1-7 may further include, wherein analysis of the image data to determine whether the condition is satisfied includes determining the gesture occurred, from the perspective of the user, within a specified distance of the recognized and tracked object.

In Example 9, at least one of Examples 1-8 may further include, wherein analysis of the image data to determine whether the condition is satisfied includes determining a person performing the gesture is, from the perspective of the user, within a specified distance of the recognized and tracked object.

In Example 10, at least one of Examples 1-9 may further include, wherein the object is a real object, as opposed to a virtual object.

Example 11 includes a method of performing operations of at least one of Examples 1-10.

Example 12 includes a machine-readable medium including instruction that, when executed by an XR device, cause the XR device to perform operations of at least one of Examples 1-10.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A wearable device comprising:
   a camera facing away from a body of a user when in use;
   processing circuitry configured to receive image data from the camera; and
   a memory device coupled to the processing circuitry and having a program stored thereon for execution by the processing circuitry to perform operations comprising:
   recognizing and tracking one or more real objects, separate from the user, in the image data;
   recognizing a gesture by the user or a person in the image data;
   analyzing the image data to determine whether a condition is satisfied, the condition indicating a recognized and tracked object, of the one or more objects, being proximate the recognized gesture and at least partially occluded by the recognized gesture, the condition determined by:
   determining bounds of a gesture object that performed the gesture, the bounds defining pixels in the image data that are part of the gesture object, the bounds including a bounding box, a bounding ellipse, or a bounding silhouette;
   determining bounds of the recognized and tracked object, the bounds defining pixels in the image data that are part of the recognized and tracked object, the bounds including a bounding box, a bounding ellipse, or a bounding silhouette;
   projecting the bounds of the gesture object to a depth of the recognized and tracked object; and
   determining whether the projected bounds of the gesture object overlaps the bounds of recognized and tracked object; and
   in response to determining that the condition is satisfied, performing an augmentation of the image data based on satisfaction of the condition.

2. The device of claim 1, wherein the operations further comprise, in response to determining the condition is not satisfied, refraining from performing the augmentation on the image data.

3. The device of claim 1, wherein the operations further comprise receiving, by the user, data indicating the gesture, condition, and the augmentation.

4. The device of claim 1, wherein the user is a first user and wherein the device is worn by the first user and the gesture is performed by the person in a field of view of the camera that is different from the first user.

5. The device of claim 1, wherein the memory further includes a circumstance, in addition to the condition, that must be detected to perform the augmentation, the circumstance indicating a social circumstance of the person performing the gesture or an action to be performed by the user or the person performing the gesture.

6. The device of claim 5, wherein the operations further comprise:
   analyze the image data to determine whether the circumstance is satisfied;
   in response to determining the condition and circumstance are satisfied, perform the augmentation on the image data; and
   in response to determining one of the condition or the circumstance are not satisfied, refrain from performing the augmentation on the image data,
   wherein the condition indicates (a) a relative position of the recognized gesture and the recognized and tracked object, (b) a specified time between recognition of the recognized gesture and the recognized and tracked object, or (c) a combination thereof.

7. The device of claim 1, wherein analysis of the image data to determine whether the condition is satisfied includes determining the gesture occurred, from the perspective of the user, within a specified distance of the recognized and tracked object.

8. The device of claim 1, wherein analysis of the image data to determine whether the condition is satisfied includes determining the user or the person performing the gesture is, from the perspective of the user, within a specified distance of the recognized and tracked object.

9. A method implemented by an extended reality (XR) device, the method comprising:
  recognizing and tracking one or more real objects, separate from a user, in image data from a camera of the XR device, the camera facing away from a body of the user wearing the XR device;
  recognizing a gesture by the user or a person in the image data;
  analyzing the image data to determine whether a condition is satisfied, the condition indicating a recognized and tracked objects, of the one or more objects, being proximate the recognized gesture and at least partially occluded by the recognized gesture, the condition determined by:
    determining bounds of a gesture object that performed the gesture, the bounds defining pixels in the image data that are part of the gesture object, the bounds including a bounding box, a bounding ellipse, or a bounding silhouette;
    determining bounds of the recognized and tracked object, the bounds defining pixels in the image data that are part of the recognized and tracked object, the bounds including a bounding box, a bounding ellipse, or a bounding silhouette;
    projecting the bounds of the gesture object to a depth of the recognized and tracked object; and
    determining whether the projected bounds of the gesture object overlaps the bounds of recognized and tracked object; and
  in response to determining that the condition is satisfied, performing an augmentation of the image data based on satisfaction of the condition.

10. The method of claim 9, further comprising, in response to determining the condition is not satisfied, refraining from performing the augmentation on the image data.

11. The method of claim 9, further comprising receiving, by the user of the XR device, data indicating the gesture, condition, and the augmentation.

12. The method of claim 9, wherein the XR device is worn by the user and the gesture is performed by the person in a field of view of the camera that is different from the user.

13. A non-transitory machine-readable medium including instructions that, when executed by an extended reality (XR) device, cause the XR device to perform operations comprising:
  recognizing and tracking one or more real objects, separate from a user, in image data from a camera of the XR device, the camera facing away from a body of the user wearing the XR device;
  recognizing a gesture by the user or a person in the image data;
  analyzing the image data to determine whether a condition is satisfied, the condition indicating a recognized and tracked object, of the one or more objects, being proximate the recognized gesture and at least partially occluded by the recognized gesture, the condition determined by:
    determining bounds of a gesture object that performed the gesture, the bounds defining pixels in the image data that are part of the gesture object, the bounds including a bounding box, a bounding ellipse, or a bounding silhouette;
    determining bounds of the recognized and tracked object, the bounds defining pixels in the image data that are part of the recognized and tracked object, the bounds including a bounding box, a bounding ellipse, or a bounding silhouette;
    projecting the bounds of the gesture object to a depth of the recognized and tracked object; and
    determining whether the projected bounds of the gesture object overlaps the bounds of recognized and tracked object; and
  in response to determining that the condition is satisfied, performing an augmentation of the image data based on satisfaction of the condition.

14. The non-transitory machine-readable medium of claim 13, further comprising determining whether a circumstance, in addition to the condition, is satisfied, and only performing the augmentation if the circumstance is satisfied, the circumstance indicating a social circumstance of the user or the person performing the gesture or an action to be performed by the user or the person performing the gesture.

15. The non-transitory machine-readable medium of claim 14, wherein the operations further comprise:
  analyzing the image data to determine whether the circumstance is satisfied;
  in response to determining the condition and circumstance are satisfied, performing the augmentation on the image data; and
  in response to determining one of the condition or the circumstance are not satisfied, refraining from performing the augmentation on the image data.

16. The non-transitory machine-readable medium of claim 13, wherein analyzing the image data to determine whether the condition is satisfied includes determining the gesture occurred, from the perspective of the user, within a specified distance of the recognized and tracked object.

17. The non-transitory machine-readable medium of claim 13, wherein analyzing the image data to determine whether the condition is satisfied includes determining the person performing the gesture is, from the perspective of the user, within a specified distance of the recognized and tracked object.

* * * * *